United States Patent
Henneken et al.

(10) Patent No.: US 6,527,672 B1
(45) Date of Patent: Mar. 4, 2003

(54) METHOD FOR CONTROLLING THE AUTOMATIC GEARBOX OF A MOTOR VEHICLE DURING SPONTANEOUS RELEASE OF THE ACCELERATOR PEDAL

(75) Inventors: Markus Henneken, Kressbronn (DE); Friedemann Jauch, Meckenbeuren (DE); Kai-Uwe Herbster, Friedrichshafen (DE); Franz-Josef Schuler, Kressbronn (DE); Thomas Mauz, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/807,910
(22) PCT Filed: Oct. 16, 1999
(86) PCT No.: PCT/EP99/07873
§ 371 (c)(1), (2), (4) Date: Apr. 19, 2001
(87) PCT Pub. No.: WO00/25046
PCT Pub. Date: May 4, 2000

(30) Foreign Application Priority Data

Oct. 24, 1998 (DE) ........................ 198 49 059

(51) Int. Cl.[7] .............................. F16H 61/18
(52) U.S. Cl. .................. 477/125; 477/118; 477/905
(58) Field of Search .................... 477/125, 154, 477/155, 118, 119, 905

(56) References Cited

U.S. PATENT DOCUMENTS

| | | | | |
|---|---|---|---|---|
| 4,111,072 A | * | 9/1978 | Harmon et al. | 477/125 |
| 4,258,591 A | * | 3/1981 | Eckert et al. | 477/125 |
| 5,362,286 A | * | 11/1994 | Satoh et al. | 477/115 |
| 5,523,944 A | * | 6/1996 | Kroger | 477/125 |
| 5,549,519 A | | 8/1996 | Seidel et al. | 477/125 |
| 5,961,420 A | * | 10/1999 | Darnell | 477/115 |
| 6,085,140 A | * | 7/2000 | Choi | 477/107 |
| 6,098,002 A | * | 8/2000 | Horiguchi et al. | 477/120 |
| 6,157,886 A | * | 12/2000 | Janecke | 477/108 |

FOREIGN PATENT DOCUMENTS

| | | |
|---|---|---|
| DE | 41 20 566 A1 | 1/1993 |
| DE | 43 334 146 A1 | 4/1994 |
| DE | 41 20 566 C2 | 4/1995 |
| EP | 0 574 965 A1 | 12/1993 |

OTHER PUBLICATIONS

Welter, Andreas, Rudolf Kragl, Harald Ender and Harry Martin. "Die Adaptive Getriebesteuer für die Automatikgetriebe der BMW Fahrzeuge mit Zwölfzylindermotor", *ATZ Automobiltechnis Zeitschrift* 94 (1992) 9, pp. 428–438.

* cited by examiner

Primary Examiner—Sherry Estremsky
Assistant Examiner—Dennis Abdeanour
(74) Attorney, Agent, or Firm—Davis & Bujold, P.L.L.C.

(57) ABSTRACT

A method for controlling an electronically controlled automatic transmission wherein the spontaneous gas/pedal release (FastOff) is detected and an upshift prevention system is activated when a pedal position gradient (PSTG) is lower than a pedal position gradient threshold (KF_PSTG); the state of the upshift prevention system (FFO=1) is active until a) a traction operation is detected when the actual pedal position value (PST) exceeds a traction-thrust characteristic line (KF_ZS) and of an acceleration potential value (FBN) equivalent to a road gradient value; and/or b) a time (T1, T2) has elapsed after a defined time period (THSV1, THSV2) wherein the state of the upshift prevention system (FFO=1) is abandoned.

14 Claims, 2 Drawing Sheets

METHOD FOR CONTROLLING THE AUTOMATIC GEARBOX OF A MOTOR VEHICLE DURING SPONTANEOUS RELEASE OF THE ACCELERATOR PEDAL

FIELD OF THE INVENTION

The invention relates to a method for controlling an automatic transmission of a motor vehicle during spontaneous release of the accelerator pedal.

BACKGROUND OF THE INVENTION

Modern automatic transmissions in motor vehicles are controlled by an electronic transmission control (EGS), which for automatic selection of a stored shift program which describes, for ex., a driver-type detection known from the publication *"ATZ Automobiltechnische Zeitschrift"* 94 (1992), an environment detection, a driving situation detection or the detection of a manual engagement and for gear selection according to situations, communicates with other control units and computers of different aggregates.

By means of shift characteristic lines stored in the electronic transmission control, the re are established the operating points at which the electronic transmission control issues to the hydraulic system a command to upshift or downshift. Here the shift characteristic lines are usually presented as function of a vehicle speed and of a throttle valve position wherein the throttle valve position reproduces the position of the accelerator pedal, in old designs the throttle valve being mechanically connected with the accelerator pedal and electronically in modern designs.

When the driver takes his foot off the accelerator pedal, the cross-section of the opening of the throttle valve for gas release, as known already, diminishes, an upshift to an economy gear such as from the third to the fourth gear being introduced at sufficiently high speed of the vehicle.

However, this proves problematic in certain driving situations such as thrust operation, since the engine rotational speed drops with the upshift. This is a hindrance when acceleration is required or desired, since actually at least one downshift—thereby taking up time—must again be carried out to be able to have available the desired engine power.

Also if such an upshift is carried out during a brief pedal release or gas release also called "FastOff" this can result, in a critical driving situation such as in an interrupted overtaking operation, not only in reducing the driving comfort but also in a dangerous situation. It is here desirable that the transmission remains in the actual gear at least for a certain amount of time, since firstly a delay of the vehicle is desired and secondly a rotational speed range with maximum input torque is favorable when, for ex., the overhaul operation is continued.

EP 0 574 965 A1 has disclosed a method for determining a shift signal from a shift characteristic field with which it is to be prevented that the transmission upshifts in the thrust operation and if that should be the case during transverse acceleration.

This is obtained by delaying the exceeding of upshift characteristic lines of the shift field by the operating point resulting form the momentary vehicle speed and a throttle valve position. According to this known method the position of the accelerator pedal is measured and when it goes beyond the upshift characteristic line it is converted to an accelerator pedal speed. The measured value thus obtained of the accelerator pedal speed is compared with a limit value stored in the transmission control. When said limit value is fallen below, a signal for upshifting is issued. The accelerator pedal speed is thus a criterion as to whether the transmission be upshifted or remains in the former gear. It is further proposed that the upshift operation be suppressed if needed when exceeding a transverse acceleration limit value.

However, in practice this method in which an upshift prevention is triggered according to a negative gradient of the accelerator pedal angle has provide disadvantageous in the sense that the upshift prevention, specially in brief pedal releases, is insufficiently sensitive. Thus the upshift prevention particularly often sets in too early or too late, or for too long or too short the driving is at a rotational speed too high for the actual operating situation. This in turn causes noticeable reduction of the driving comfort.

DE 41 20 566 has disclosed an other method for transmission control. In this known method, for activation of the upshift prevention system, in addition to the pedal angle gradient, the criterion "thrust operation" must be detected over a traction-thrust characteristic line, but this is not enough to ensure a correct shifting behavior during spontaneous gas release.

This invention is based on the problem of making available a method for control of an automatic transmission of a motor vehicle during spontaneous gas/pedal release with which an upshift prevention adapted to the driving situation is carried out so that during spontaneous pedal release a driving speed delay occurs and at the same time the greatest possible spontaneity is given for a subsequent acceleration.

SUMMARY OF THE INVENTION

In the inventive method the state of upshift prevention is advantageously activated not only according to a pedal position gradient but also taking into account the sportiveness of the driving behavior by the driver-type evaluation counter and the detection of the thrust operation according to engine rotational speed and road gradient. This makes possible a precise transmission adjustment with a shift strategy that does justice to the situation by being adapted to the environment, for ex., uphill or downhill driving, and to the driver type.

To the precision of the inventive method during a spontaneous gas/pedal release contributes that the state of upshift prevention is abandoned only when several criteria essential therfoe are satisfied. One of the these exit criteria consists is that the electronic transmission control must clearly detect traction operation. In addition limit values of the pedal position gradient and time limits according to the road gradient are tested as added exit criteria.

The use of characteristic fields in the inventive method has in addition clear advantages, specially relative to the use of limit values. While the problem exists when using limit values that at low pedal position value, that is, accelerator pedal only slightly depressed, there is only available a small resetting way and thus an accordingly lower pedal position gradient is given which is often below a limit value needed to activate the upshift prevention system, in a characteristic field where the curve of the pedal position gradient begins at zero, there exists the possibility of an upshift prevention during spontaneous pedal release even when the pedal is only slightly depressed.

While the state of upshift prevention is abandoned only after a first time, when a specific positive pedal position gradient has not been exceeded and in the case that the positive pedal position gradient be exceeded and again fallen below, a second time is started after which the state of upshift prevention is abandoned, when the positive pedal position gradient threshold has not again been exceeded during this time, the exit must only be introduced when a constant accelerator pedal position is detected with certainty.

With the inventive upshift prevention system during a spontaneous gas/pedal release increased comfort and greater security result in critical situations such as an interrupted overhaul operation.

In an advantageous embodiment of the inventive method it can be provided that a third time be started when a negative pedal position gradient is fallen below before the first time period has elapsed.

The exit from the state of shift prevention takes place here when traction operation is detected but a negative pedal position gradient threshold has been fallen below. Then a third delay time is started which is limited according to the road gradient, that is, uphill or downhill drive. Therewith it obtained that a repeated negative pedal position gradient be taken into account and the exit can be delayed.

BRIEF DESCRIPTION OF THE DRAWING(S)

Figure 3:
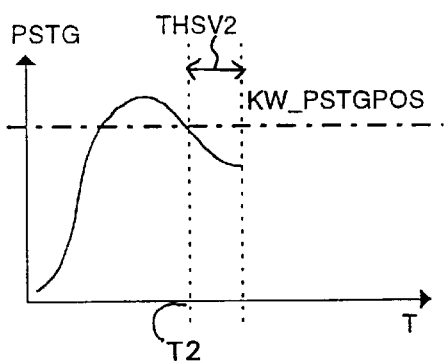
Figure 4:
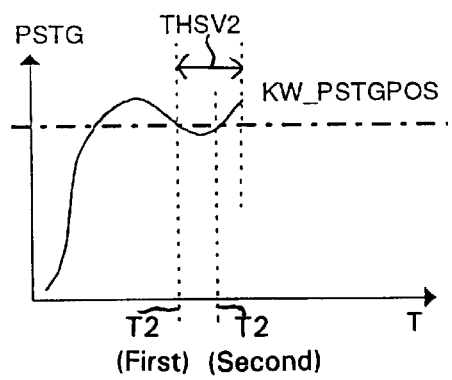
Figure 5:
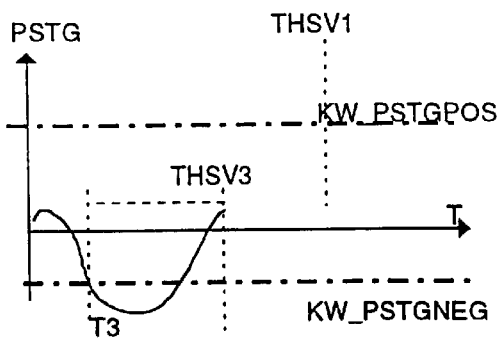

FIG. 3 is a curve of the pedal position gradient according to time, the state of upshift prevention being abandoned according to another pedal position gradient threshold and another time limit; and FIG. 4 a curve of the pedal position gradient of FIG. 3 according to time, the state of upshift prevention being maintained according to the pedal position gradient threshold and time limit of FIG. 3; and FIG. 5 a curve of a pedal position gradient according to time, the state of upshift prevention being abandoned according to another pedal position gradient threshold, another time limit and a road gradient.

DETAILED DESCRIPTION OF THE INVENTION

Figure 1:
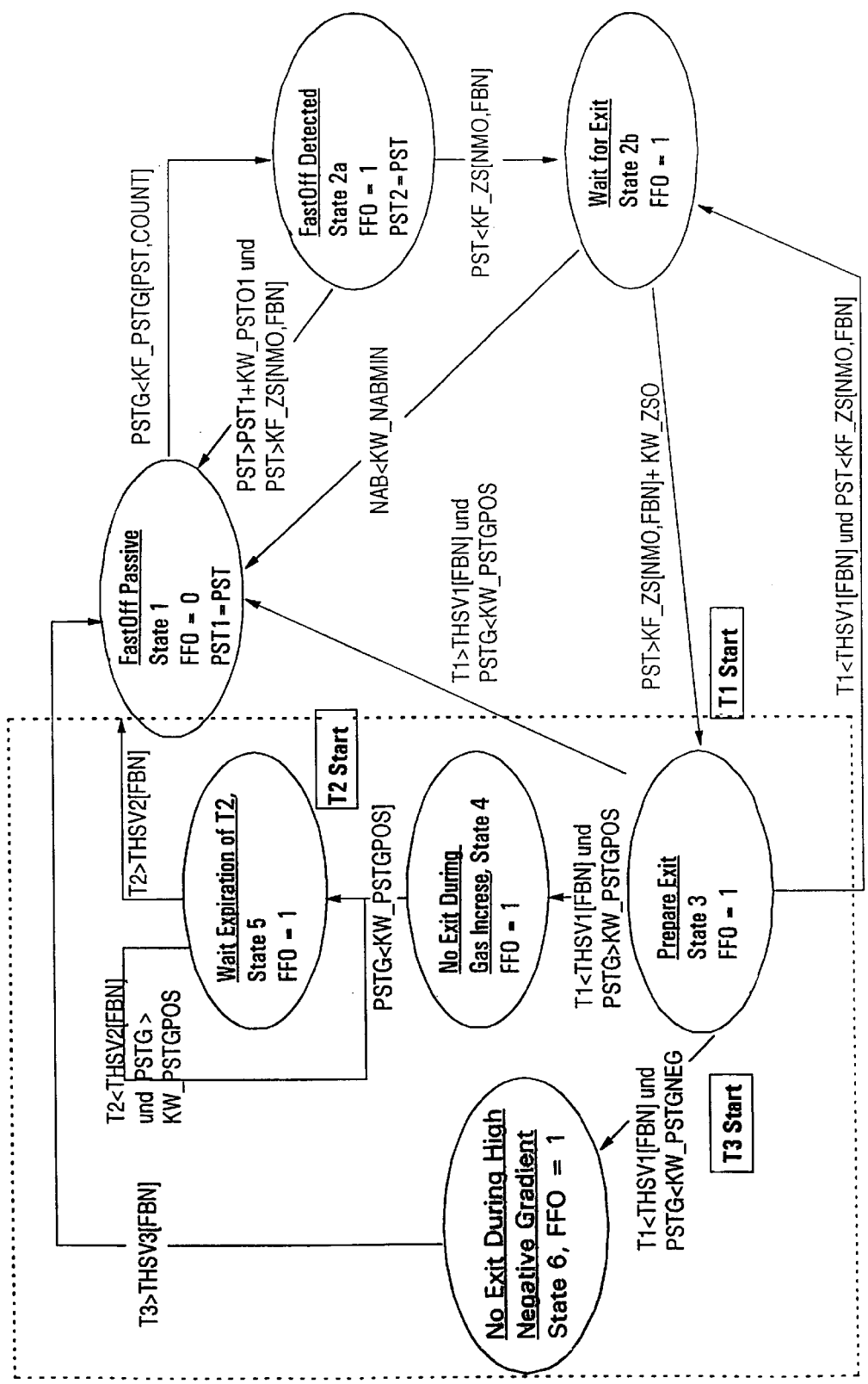
FIG. 1 is a schematized representation of a method for control of an automatic transmission of a motor vehicle during a spontaneous gas/pedal release in a state diagram.

Referring to FIG. 1 it schematically shows a method for control of an automatic transmission of a motor vehicle during a spontaneous gas/pedal release called "FastOff" wherein the automatic transmission is driven by an internal combustion engine controlled by with an accelerator pedal and has an electronic transmission control where a shift characteristic field is stored.

FIG. 1 shows the structure of the method as state automatic machine in which one state is always active. Each time the program is run, specific conditions are tested in the current state. If one of these conditions applies, the actual state is changed according to condition. If none of the conditions applies, the last state is again run.

In the first place defined as state 1 that spontaneous gas release or pedal release exists for which reason state 1 is designated as "FastOff passive". The electronic transmission control detects in this state 1 that a changeable variable FFO (flag FastOff) indicative of the spontaneous pedal release is occupied with "O" and thus has not been satisfied. Accordingly, the electronic transmission control also issues no command for upshift prevention.

When state 1 "FFO=0" is detected, an actual pedal position value PST is stored as pedal position value PST1 for the state 1. The pedal position value PST is here calculated by the electronic transmission control from a signal of the throttle valve position fed to it which is proportional to the pedal position and serves as output value for calculating a pedal position gradient PSTG.

Besides, in the state 1 the non-active upshift prevention system is interrogated as to whether the actual pedal position gradient PSTG is lower than a pedal position gradient threshold KF_PSTG[PST,COUNT] stored in a characteristic field as function of the pedal position value PST and of a driver-type evaluation counter COUNT.

The driver-type evaluation counter COUNT is here of conventional kind such as described in "ATZ Automobiltechnische Zeitschdff" 94 (1992), pages 428 ff.

In a positive interrogation result, the upshift prevention is started and change is made to state 2a defined as "FastOff detected" state.

In this state 2a the electronic transmission control detects the variable occupation "FFO=1" and stores the actual pedal position value PST2.

When the upshift prevention system is now active, it is tested in state 2a whether traction operation is detected while the actual pedal position value PST is on or above a traction-thrust characteristic line KF_ZS[NMO,FBN] dependent on the engine rotational speed NMO and the road gradient FBN, change is made to a state 2b which is defined as state "wait for exit" in which likewise the upshift prevention system "FFO=1" is active.

In state 2b is established whether a minimum vehicle speed has been fallen below which is the case when a transmission output rotational speed NAB is lower than a predefined minimum transmission output rotational speed KW_NABMIN. If this applies, the state of upshift prevention is abandoned and the state 1 with deactivated upshift prevention system returned to.

In state 2b a spontaneous pedal release is established with certainty, since it has been detected that both a negative pedal position gradient exists and that gear shift was made to the thrust operation.

In order to test whether one of several exit criteria framed with dotted lines in FIG. 1 out of the state of upshift prevention is given, a first time T1 is started and change is made from state 2b "wait for exit" to a state 3 which is defined as state "prepare exit" when the actual pedal position value PST is on or above the traction-thrust characteristic line KF_ZS[NMO,FBN] dependent on the engine rotational speed NMO and the road gradient value FBN plus an offset value KW_ZSO which represents an applicable variable.

Alternative to this the condition for a start of the first time T1 and for a change from state 2b "wait for exit" to state 3 "prepare exit" can also be established in a manner such that the actual pedal position value PST must be higher than the pedal position value PST2 at the moment of detection of the spontaneous gas/pedal release "FastOff2" plus an applicable offset value KW_PSTO2.

With the first time T1 is associated a first limited time period THSV1 for upshift prevention or upshift delay, the length of which is established according to the road gradient value FBN determined in one other module of the electronic transmission control.

When in state 3 thrust operation again is suddenly detected, that is, the actual pedal position value PST during activated upshift prevention system is below the traction-thrust characteristic line KF_ZS[NMO,FBN] dependent on the engine rotational speed NMO and the road gradient value FBN and the first time period THSV1 still has not expired, it is returned form state 3 "prepare exit" to state 2b "wait for exit".

Figure 2:
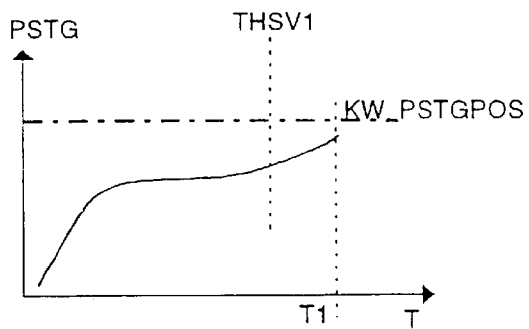
FIG. 2 is a curve of a pedal position gradient according to the time, the state of upshift prevention being abandoned according to a pedal position gradient threshold and a time limit.

FIG. 2 shows the case that the first time period THSV1 has elapsed and the pedal position gradient PSTG remains in the first time T1 under a positive pedal position gradient threshold KW_PSTGPOS. When this is established in state 3 "prepare exit", state 1 of the deactivated upshift prevention system is returned to, as is to be understood from FIG. 1.

When the time period THSV1 still has not expired and the pedal position gradient PSTG exceeds a positive pedal position gradient threshold, then change is made from state 3 "prepare exit" to another state 4 called "no exit during gas increase".

In FIG. 3 and FIG. 4 is shown the vase that the pedal position gradient PSTG again drops below a positive pedal position gradient threshold KW_PSTGPOS. When this is established in state 4, a second delay time T2 is started with a limited time period THSV2 [FBN] associated with it and again measured according to the road gradient value FBN and change is made to a state 5 designated in FIG. 1 with "wait for expiration of T2".

When in the state 5 is determined that the second time period THSV2 has elapsed, as shown in FIG. 3, change is made to the state 1, that is, the upshift prevention system is deactivated.

However, in case the second time period THSV2 still has not elapsed and the pedal position gradient PSTG again exceeds the positive pedal position gradient threshold, as can be seen in FIG. 4, state 5 is then repeated and the second time T2 again started.

Observing again state 3, namely, "prepare exit" it is to be seen in FIG. 1 and specially in FIG. 5 that a third delay time T3 is started with which is associated a limited time period THSV3 again dependent on the road gradient value FBN when then first time period THSV1 still has not elapsed and the pedal position gradient PSTG falls below a negative pedal position gradient threshold KW_PSTGNEG. In this case change is made from the state 3 to another state 6 designed in FIG. 1 as "no exit during high negative gradient". The state of the upshift prevention is abandoned here as soon as the third time period THSV3 has expired.

As alternative to the start of the third time T3 it can also be provided in another embodiment that the first time T1 be again started when a negative pedal position gradient threshold KW_PSTGNEG is fallen below before the first time period THSV1 has elapsed.

The positive and the negative pedal position gradient threshold KW_PSTGPOS, KW_PSTGNEG are here established each according to the pedal position PST and the driver-type evaluation counter COUNT.

In all the states described with an upshift prevention system this obviously only applied according to the conditions set forth when a maximum engine limitation rotational speed NM_MAX has not been exceeded.

Nomenclature

| | |
|---|---|
| COUNT | driver-type evaluation counter |
| FastOff | spontaneous gas/pedal release |
| FBN | road gradient value, acceleration potential |

-continued

Nomenclature

| | |
|---|---|
| FFO | flag for upshift prevention |
| KF_PSTG | pedal position gradient threshold f(PST, COUNT) |
| KF_ZS | traction-thrust characteristic line, f(NMO, FBN) |
| KW_NABMIN | minimum output rotational speed in FastOff |
| KW-PSTGNEG | negative pedal position gradient threshold |
| KW_PSTGPOS | positive pedal position gradient threshold |
| KW_PSTO1 | offset value to detect traction operation with certainty |
| KW_PSTO2 | offset value to rule out increase of the pedal position value |
| KW_ZSO | throttle valve offset for exit from FastOff |
| NAB | transmission output rotational speed |
| NAB_MIN | minimum transmission output rotational speed |
| NMO | engine rotational speed |
| PST | pedal position |
| PST1 | pedal position value, throttle valve value when detecting FastOff |
| PST2 | pedal position value, throttle valve value |
| T1 | first time for exit conditions |
| T2 | second time for exit conditions |
| T3 | third time for exit conditions |
| THSV_1 | first delay time for exit, f(FBN) |
| THSV_2 | second delay time for exit, f(FBN) |
| THSV_3 | third delay time for exit, f(FBN) |

What is claimed is:

1. A method for controlling an automatic transmission of a motor vehicle during a spontaneous gas/pedal release (FastOff) wherein the automatic transmission is driven by an internal combustion engine controllable with an accelerator pedal and a signal proportional to a pedal position is fed to an electronic transmission control where a shift characteristic field is stored comprising the steps of:

detecting a spontaneous gas/pedal release (FastOff) and in response thereto activating an upshift prevention system, when a pedal position gradient (PSTG) is lower than a pedal position gradient threshold (KF_PSTG) stored in a characteristic field as function of a pedal position value (PST) and of a driver-type evaluation counter (COUNT);

maintaining the state of the upshift prevention system (FFO=1) until one of;

a traction operation is detected when the actual pedal position value (PST) exceeds a traction-thrust characteristic line (KF_ZS) stored in a characteristic field as function of a value equivalent to the engine rotational speed (NMO) and of an acceleration potential value (FBN) equivalent to a road gradient value; and a time (T1, T2) has elapsed after a defined time period (THSV1, THSV2), the time period THSV1 being a function of the acceleration potential value (FBN) equivalent to a road gradient value and the state of the upshift prevention system (FFO=1) being abandoned after a first time period (THSV1) when the pedal position gradient (PSTG) in the first time (T1) remains below a positive pedal position gradient threshold (KW_PSTGPOS) and a second time (T2) being started when the positive pedal position gradient threshold (KW_PSTGPOS) is exceeded and again fallen below, the state of the upshift prevention system (FFO=1) being abandoned after expiration of the second time period (THSV2) when the positive pedal position gradient threshold (KW_PSTGPOS) has not been again exceeded in the second time period (THSV2).

2. The method according to claim 1, comprising abandoning the state of the upshift prevention (FFO=1) when the actual pedal position value (PST) is higher than a fastoff start pedal position value determined at the start of upshift prevention plus an offset value (KW_PSTO1) and traction operation is detected when the actual pedal position value (PST) is on or above the traction-thrust characteristic line (KF_ZS) dependent on the engine rotational speed (NMO) and the road gradient value (FBN).

3. The method according to claim 1, comprising abandoning the state of upshift prevention (FFO=1) when a transmission output rotational speed (NAB) is lower than a predefined minimum transmission output rotational speed (KW_NABMIN).

4. The method according to claim 1, starting the first time (T1) in a "wait for exit" state when a traction operation is detected and wherein a "wait for exit" state is a state of operation wherein the transmission may abandon the upshift prevention state upon both the expiration of a time interval and the occurrence of one or more conditions.

5. The method according to claim 4, comprising detecting the thrust operation when the actual pedal position value (PST), while the upshift prevention system is activated, is below the thrust-traction characteristic line (KF_ZS) dependent on the engine rotational speed (NMO) and the road gradient value (FBN).

6. The method according to claim 1, comprising changing in the first time period (THSC1) from the "wait for exit" state to a "prepare exit" state when the actual pedal position value (PST) is on or above the traction-thrust characteristic line (KF_ZS) dependent on the engine rotational speed (NMO) and the road gradient value (FBN) plus an offset value (KW_ZSO), wherein a "wait for exit" state is a state of operation wherein the transmission may abandon the upshift prevention state upon both the expiration of a time interval and the occurrence of one or more conditions and wherein a "prepare for exit" state is a state of operation wherein a time interval has expired, or when the actual pedal position value (PST) is higher than a fastoff start pedal position value (PST2) at the moment of detection of the spontaneous gas/pedal release (FastOff) plus an offset value (KE_PSTO2).

7. The method according to claim 6, comprising returning from the "prepare exit" state to the "wait for exit" state to when thrust operation is detected before the first time period (THSVC1) has expired.

8. The method according to claim 1, comprising starting the second time (T2) again when the positive pedal position gradient threshold (KW_PSTGPOS) has been exceeded in the second time period (THSV2).

9. The method according to claim 1, comprising abandoning a third time (T3) when a negative pedal position gradient threshold (KW_PSTGNEG) is fallen below before the first time period (THSV1) has elapsed, the state of upshift prevention (FFO=1) being abandoned when a third time period (THSV3) has expired.

10. The method according to claim 1, comprising again starting the first time when a negative pedal position gradient threshold (KW_PSTGNEG) is fallen below before the first time period (THSV1) has elapsed.

11. The method according to claim 1, wherein one of the positive and the negative pedal position gradient threshold (KW_PSTGPOS, KW_PSTGNEG) is established according to the pedal position (PST) and the driver-type evaluation counter (COUNT).

12. The method according to claim 1, wherein one of the first and second and a third time period of the upshift delay (THSV1, THSV2, THSV3) is determined according to the road gradient value (FBN).

13. The method according to claim 1, wherein at least one variable of the driver-type evaluation counter (COUNT) is determined in a program module of the electronic transmission control for evaluation of the driving behavior.

14. The method according to claim 1, wherein the state of upshift prevention is deactivated when a maximum engine rotational speed (NMO_MAX) is exceeded.

* * * * *